United States Patent [19]

Yamazaki et al.

[11] Patent Number: 5,800,759
[45] Date of Patent: Sep. 1, 1998

[54] INSERT MOLDED ARTICLE, AND APPARATUS AND METHOD FOR PRODUCING THE INSERT MOLDED ARTICLE

[75] Inventors: Seiichi Yamazaki; Shiroh Okuno, both of Kyoto, Japan

[73] Assignee: Nissha Printing Co., Ltd., Kyoto, Japan

[21] Appl. No.: 295,663

[22] PCT Filed: Dec. 27, 1993

[86] PCT No.: PCT/JP93/01903

§ 371 Date: Aug. 26, 1994

§ 102(e) Date: Aug. 26, 1994

[87] PCT Pub. No.: WO94/14590

PCT Pub. Date: Jul. 7, 1994

[30] Foreign Application Priority Data

Dec. 27, 1992 [JP] Japan .................................. 4-358267
Mar. 18, 1993 [JP] Japan .................................. 5-085482

[51] Int. Cl.$^6$ ......................................................... B28B 7/14
[52] U.S. Cl. .................... 264/163; 264/40.5; 264/294; 264/328.1; 264/328.16; 425/149; 425/292; 425/590; 425/595
[58] Field of Search ....................... 264/163, 40.5, 264/294, 328.1, 156, 328.9, 160, 328.7, 328.12, 328.13, 328.14, 328.16; 425/149, 555, 595, 590, 145, 150, 292; 72/54, 60, 63, 704, 61; 29/421.1

[56] References Cited

U.S. PATENT DOCUMENTS

| | | | |
|---|---|---|---|
| 4,755,129 | 7/1988 | Baker et al. | 425/292 |
| 4,826,641 | 5/1989 | Takeda et al. | 264/40.5 |
| 4,882,117 | 11/1989 | Takeda et al. | 264/328.9 |
| 4,901,552 | 2/1990 | Ginty et al. | 72/60 |
| 5,002,706 | 3/1991 | Yamashita | 264/2.2 |
| 5,128,091 | 7/1992 | Agur et al. | 264/512 |
| 5,195,162 | 3/1993 | Sultan et al. | 385/130 |
| 5,196,152 | 3/1993 | Gamache et al. | 264/163 |
| 5,221,232 | 6/1993 | Nameny | 694/98 |
| 5,271,882 | 12/1993 | Shirahata et al. | 264/509 |

FOREIGN PATENT DOCUMENTS

| | | |
|---|---|---|
| 57-102328 | 6/1982 | Japan . |
| 59-202834 | 11/1984 | Japan . |
| 62-41011 | 2/1987 | Japan . |
| 63-25012 | 2/1988 | Japan . |
| 63-107523 | 5/1988 | Japan . |
| 63-268612 | 11/1988 | Japan . |
| 1-163036 | 6/1989 | Japan . |
| 4-10923 | 1/1992 | Japan . |
| 2 191 729 | 12/1987 | United Kingdom . |

*Primary Examiner*—Merrick Dixon
*Attorney, Agent, or Firm*—Wenderoth, Lind & Ponack, L.L.P.

[57] ABSTRACT

A method and apparatus are provided for producing insert molded articles. The involves the steps of preforming a patterned insert material clamped at end parts thereof by a clamping device into a predetermined shape corresponding to the shape of a cavity formation face of a male die or a female die of an injection molding die by a preforming device, and trimming an unnecessary portion of the preformed material by a trimming device so as not to project from the peripheral edge of the surface of a cubic molded article to be formed of molding resin. The method further involves setting the trimmed material at the cavity formation face of the male or female die of the injection molding die, clamping the male and female dies to form a cavity by the cavity formation faces, injecting molding resin into the cavity, and removing the insert molded article from the injection molding die after the molding resin is cooled and softened. During preforming, a preforming die having a projecting part corresponding in shape to the cavity formation face of the injection molding die is used, so that the patterned insert material can be preformed corresponding to the shape of the projecting part of the preforming die. Moreover, prior to the preforming of the patterned insert material, the patterned insert material is heated and softened after, before, or while being held in contact with the top face of the projecting part of the preforming die, so that the patterned insert material is preformed to trace the projecting part of the preforming die.

30 Claims, 12 Drawing Sheets

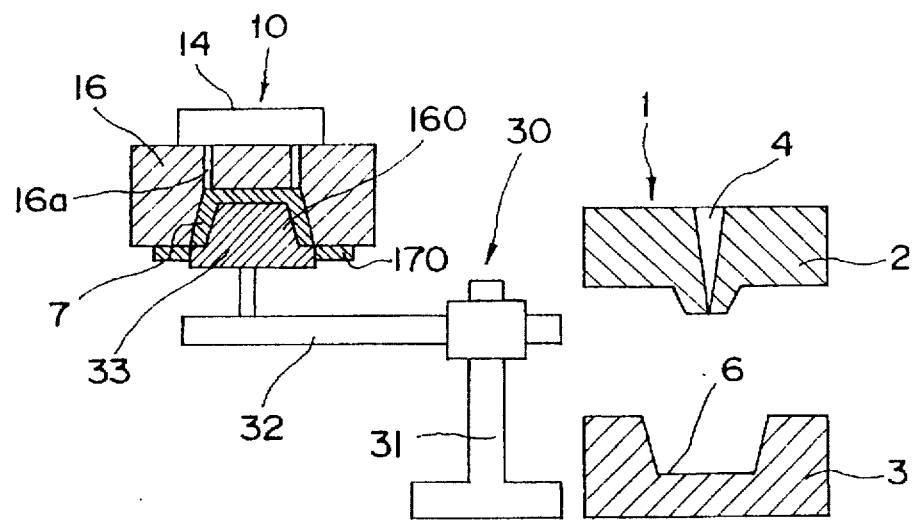
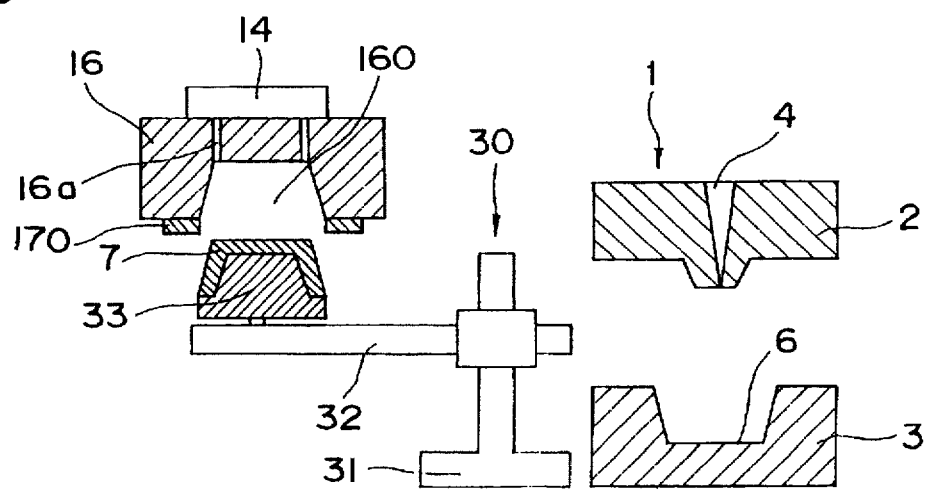
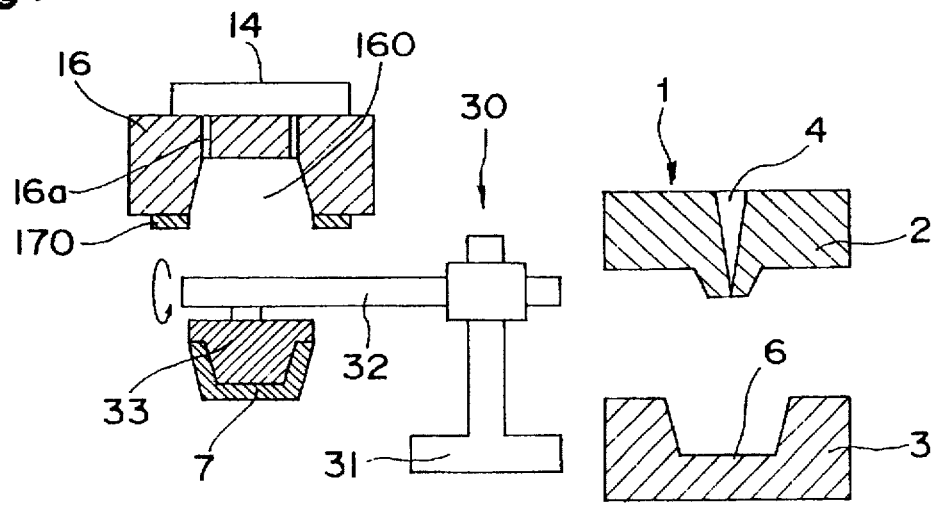

INSERT MOLDED ARTICLE, AND APPARATUS AND METHOD FOR PRODUCING THE INSERT MOLDED ARTICLE

TECHNICAL FIELD

The present invention relates to an insert molded article to be used as front panels or buttons of AV (audio-visual) devices or instrument panels of automobiles, and an apparatus and a method for producing the insert molded article.

BACKGROUND ART

There have been employed such apparatuses and methods (1) as disclosed in Japanese Laid-Open Patent Publication Nos. 57-102328 (102328/1982), 59-202834 (202834/1984) and such apparatuses and methods (2) as disclosed in Japanese Laid-Open Patent Publication No. 63-25012 (25012/1988) to obtain insert molded articles.

According to the apparatus and method (1) above, a patterned insert material of a preformed plastic film is set in a female die of an injection molding die for an insert molded article. An unnecessary portion of the patterned insert material is cut within the injection molding die.

According to the apparatus and method (2), meanwhile, the apparatus consists of a pair of dies defining a cavity in the shape of a to-be-formed product, a cutting means for operating to cut a blank from a long insert film, and a transferring means for supplying the blank from the cutting means to the pair of dies and then setting the blank in the cavity in preparation for a molding process. After the long insert film is cut to a suitable length by the cutting means of the apparatus, notches are formed in the film, to thereby form a blank with a flange in development. Then, the blank is fed and introduced into the completely prepared dies by the transferring means, and then the die clamping and insert molding are performed. The blank is introduced in the dies while the blank is flat without being preformed at this time. The introduced blank is once brought in tight contact with the male die to bend the flange for a preforming process. After the dies are clamped, the preformed blank is pressed from the male die to the female die by the pressure of molding resin injected from the male die.

The above-described conventional apparatus and methods have some drawbacks as follows.

In the arrangement (1), since the unnecessary portion of the patterned insert material is cut and removed by utilizing the edges of the male and female dies in the injection molding die, the film refuse produced in the cutting of the insert material is accumulated and becomes a hard lump in the periphery of the edges of the dies, so that the surface of each die in the periphery of the edge is damaged by the lump. The dies are accordingly required to be frequently exchanged, which increases maintenance costs. The film refuse also adheres to the surface of the patterned insert material or the surfaces of the dies, and mingles with the molding resin. As a result, the film refuse is adhered to the surface of an insert molded article and the number of defective articles is increased.

The molding resin is injected from either one of the male and female dies of the injection molding die. Therefore, the male and female dies are heated at different temperatures, showing different expansion coefficients. It is hence difficult to maintain the distance between the edges of the male and female dies constant at all times. When the edges of both dies core too close, the edges are broken. If the edges are separated by too much distance, the insert material is not properly cut, thereby raising the costs of the dies and film.

In the arrangement (2), the insert film is notched and trimmed to have the flange in development to agree with a recessed surface of the female die forming the cavity of the injection molding die. If a three-dimensional, smooth and curved insert molded article, e.g., a round bowl is to be formed, the notch should be correctly cut in the insert film so as to avoid leakage of the molten molding resin from the joint of the flange of the blank. This requires a large amount of labor and time, and therefore is not practical. Since the joint of the flange is present, the joint is exposed on the surface of the molded article, degrading the aesthetic design of the finished article.

Furthermore, in the arrangement (2), the flat blank without being preformed in the shape of the cavity formation face of the female die is fed into the injection molding die. Therefore, in the arrangement (2), since it is required to preform the blank within the injection molding die, the blank is temporarily held in tight contact with a projecting cavity formation face of the male die and then pressed to the recessed cavity formation face of the female die by the pressure of the molding resin. However, the pressure to the blank in the vicinity of a resin injection port is not rendered equal to that acting to the blank at a portion away from the resin injection port. As the blank is being pressed by the molten resin, the blank is deformed or wrinkles, or is shifted in position when moved from the male die to the female die. The blank is sometimes not set at a correct position of the female die.

The object of the present invention is to remedy the above-described disadvantages and to provide an insert molded article and an apparatus and a method for producing the insert molded article, whereby film refuse is not generated within an injection molding die, and a patterned insert material is held at a correct position closely in touch with a cavity formation face of the injection molding die defining an optional three-dimensional cavity, without exposing molding resin at the surface of the insert molded articles, so that highly quality insert molded articles can be produced at low cost with a high yield.

DISCLOSURE OF INVENTION

In order to accomplish the aforementioned object, the present invention is constituted as will be described below.

That is, a first aspect of the present invention is constructed as follows. A patterned insert material clamped at end parts thereof by a clamping means is preformed into a predetermined shape corresponding to a cavity formation face of a male or female die of an injection molding die, and an unnecessary portion of the preformed patterned insert material is trimmed so as not to project from the peripheral edge of the surface of a cubic molded article to be formed of molding resin. The trimmed patterned insert material is set at the cavity formation face of the male or female die of the injection molding die. Then, after a cavity is formed by the cavity formation faces by clamping the male and female dies, the molding resin is injected into the cavity. An insert molded article is taken out from the injection molding die after the molding resin is cooled and solidified.

A second aspect of the present invention is constructed as follows. In the constitution of the above first aspect, the patterned insert material is preformed by using a preforming die having a projecting part corresponding in shape to the cavity formation face of the injection molding die, so that the patterned insert material agrees in shape with the projecting part of the preforming die. Prior to the preforming of the patterned insert material, the patterned insert material is heated and softened before, after, or while held in touch with a top face of the projecting part of the preforming die, so that the patterned insert material is preformed to trace the shape of the projecting part of the preforming die.

A third aspect of the present invention is constructed to provide a preforming means for preforming a patterned insert material through thermal molding to correspond in shape to a cavity formation face of a male or female die of an injection molding die, a clamping means for clamping end parts of the patterned insert material before preforming of the material, a trimming means for trimming an unnecessary portion of the preformed patterned insert material so as not to project from the peripheral edge of the surface of a cubic molded article to be formed of molding resin, and an injection molding die which forms a cavity for forming the cubic molded article by clamping the male and female dies while the trimmed insert material is set at the cavity formation face of the male or female die.

According to the producing method of an insert molded article in the first aspect of the present invention, the patterned insert material is preformed to correspond in shape to the cavity formation face of the male or female die of the injection molding die, and an unnecessary portion of the patterned insert material is trimmed so as not to project from the peripheral edge of the surface of the cubic molded article before the material is set in the injection molding die. Therefore, the film refuse is not adhered to or accumulated at the surface of the injection molding, or does not mingle with the molten resin, so that the insert molded articles are obtained with a high yield. Moreover, it can be effectively prevented that a broken piece of the blade generated when the patterned insert material is trimmed enters the injection molding die, or the patterned insert material is not properly trimmed. Furthermore, since the patterned insert material is preformed to correspond in shape to the cavity formation face of the male or female die of the injection molding die, even if the cavity formation face of the male or female die of the injector molding die is a three-dimensional shape, it is not necessary to form a notch in the patterned insert material, thus making it possible to avoid that the molding resin leaks out from the notch to adhere to the surface of the patterned insert material. Since the notch does not appear on the surface of the obtained cubic molded article, the molded article shows superior taste of design.

According to the second aspect of the present invention, since a portion of the patterned insert material corresponding to the top face of the molded article is brought in touch with the top face of the projecting part of the preforming die, the distance to be stretched becomes considerably small in the subsequent processes. Although the patterned insert material is heated and softened, the portion of the patterned insert material in touch with the top face of the projecting part of the preforming die is apt to soften less than a portion not in touch with the top face of the projecting part of the preforming die. Therefore, even in the case where the latter portion is stretched further through vacuum suction or the like manner, the former portion is little stretched, whereby the generation of wrinkles or positional shift can be effectively prevented.

According to the producing apparatus of insert molded article of the third aspect of the present invention, the patterned insert material is preformed by the preforming means to correspond in shape to the cavity formation face of the male or female die of the injection molding die, and an unnecessary portion of the patterned insert material is trimmed by the trimming means so as not to project from the peripheral edge of the surface of the cubic molded article before the patterned insert material is set in the injection molding die. Therefore, the film refuse is never adhered to or accumulated at the surface of the injection molding die, or mixed with the molten resin, so that the insert molded articles can be obtained with a high yield. It can also be effectively prevented that a broken piece of the blade generated when the patterned insert material is trimmed enters the injection molding die or the patterned insert material is not properly trimmed. Further, since the patterned insert material is preformed by the preforming means to correspond in shape to the cavity formation face of the male or female die of the injection molding die, even if the cavity formation face of the male or female die of the injection molding die has a three dimensional shape, it is not necessary to form a notch in the patterned insert material, thereby preventing that the molding resin leaks from the notch to adhere to the surface of the patterned insert material. The notch does not appear on the surface of the cubic molded article, so that the molded article is superior in terms of design.

BRIEF DESCRIPTION OF THE DRAWINGS

These and other objects and features of the present invention will become apparent from the following description taken in conjunction with the preferred embodiments thereof with reference to the accompanying drawings, in which;

FIG. 10 is a sectional view showing the transferring/setting means in the apparatus;

FIG. 11 is a sectional view showing one operation of the transferring/setting means in FIG. 10;

FIG. 12 is a sectional view showing one operation of the transferring/setting means in FIG. 10;

BEST MODE FOR CARRYING OUT THE INVENTION

Figure 1:
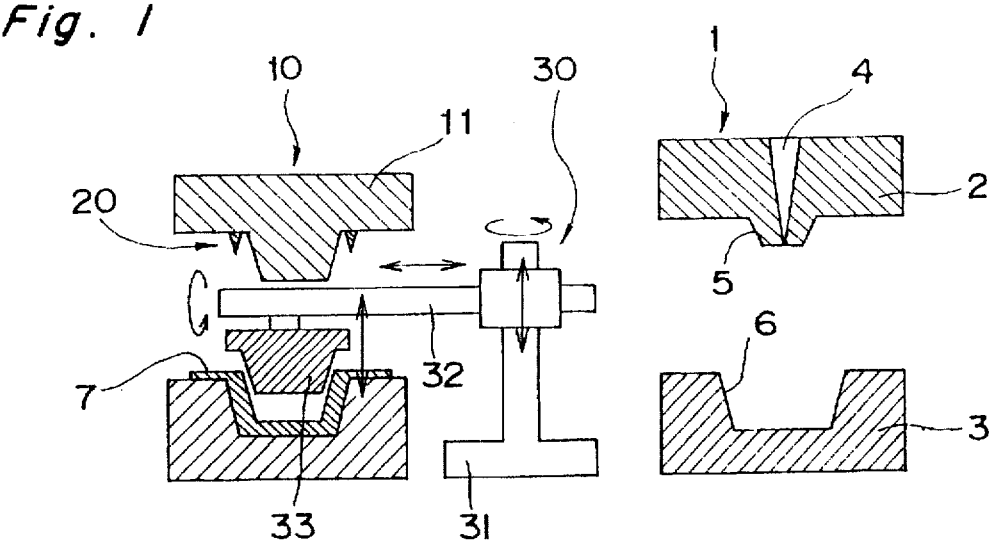
FIG. 1 is a sectional view of one process in an apparatus and a method for producing an insert molded article according to one embodiment of the present invention.
Figure 2:
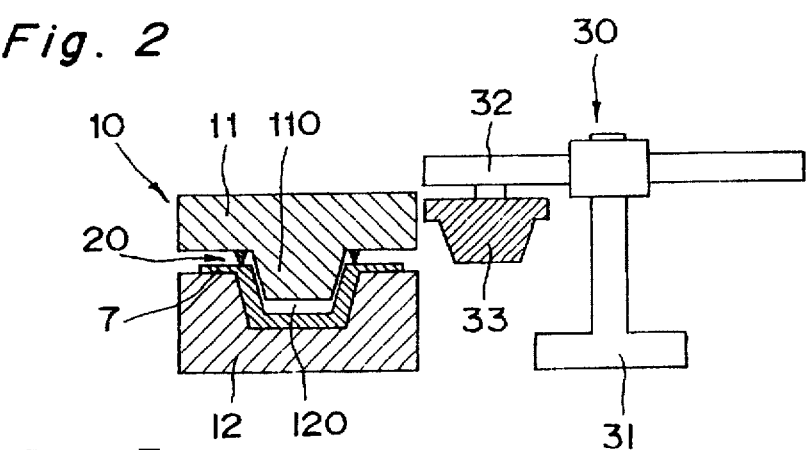
FIG. 2 is a sectional view showing a state where a patterned insert material is preformed and trimmed in the apparatus and method according to the embodiment.

Before the description of the present invention proceeds, it is to be noted that like parts are designated by like reference numerals throughout the accompanying drawings.

A producing apparatus of an insert molded article according to one embodiment of the present invention will be discussed first.

The apparatus is provided with a clamping means 13 for holding a patterned insert material 7, a preforming means 10 for preforming the material 7, a trimming means 20 for trimming the material 7 after being preformed, and an injection molding die 1 wherein the trimmed material 7 is inserted for injection molding into a cavity 8 defined by a projecting cavity formation face 5 of a male die 2 and a recessed cavity formation face 6 of a female die 3.

The preforming means 10 is provided to preform the patterned insert material 7 into the shape in correspondence with the shape of the cavity formation face of the male die 2 of the injection molding die for forming the cavity, preferably, into the shape almost complementary with the cavity formation face of the male die 2 through thermal molding (referring to FIGS. 6A–6C, 7A, 7B, and 8A–8C). The cavity formation face is composed of the recessed cavity formation face 6 of the female die 3 and the projecting cavity formation face 5 of the male die 2 of the injection molding die 1.

Figure 27:
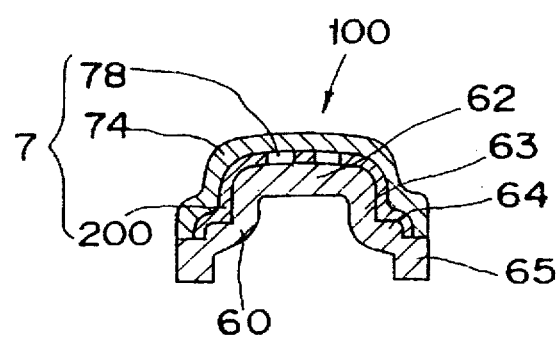
FIG. 27 is a sectional view showing one operation of a different example of the insert molded article obtained in the embodiments.

The shape of the cavity formation face of the preforming means 10 is generally the same as that of an insert molded article 100 except the inverse relationship of the projecting face and recessed face, and therefore, the shape of the cavity formation face will be discussed in relation to the to-be-molded article 100. As shown in FIG. 27, the insert molded article 100 has a shape having a circular top face 62, an annular skirt portion 63 extending from the peripheral edge of the top face 62 generally downward in FIG. 27, an annular flange 64 extending about the periphery of the lower end of the skirt portion 63, and an annular second skirt portion 65 generally downward from the peripheral edge of the flange 64. However, the insert molded article 100 is not restricted in shape to this so long as it has two portions, namely, the top face 62 and the skirt portion 63 extended generally downward from the periphery of the top face 62. An elliptical shape can be designed instead of the circular shape. Moreover, the shape of the cavity formation face of the preforming means 10 is not necessarily perfectly complementary with that of the cavity of the insert molded art hole 100, and can be almost completely complementary with the shape of the cavity of the insert molded article 100 by the utilization of the pressure at the time of injection molding after preforming to generally correspond to the shape of the cavity.

Figure 17A:
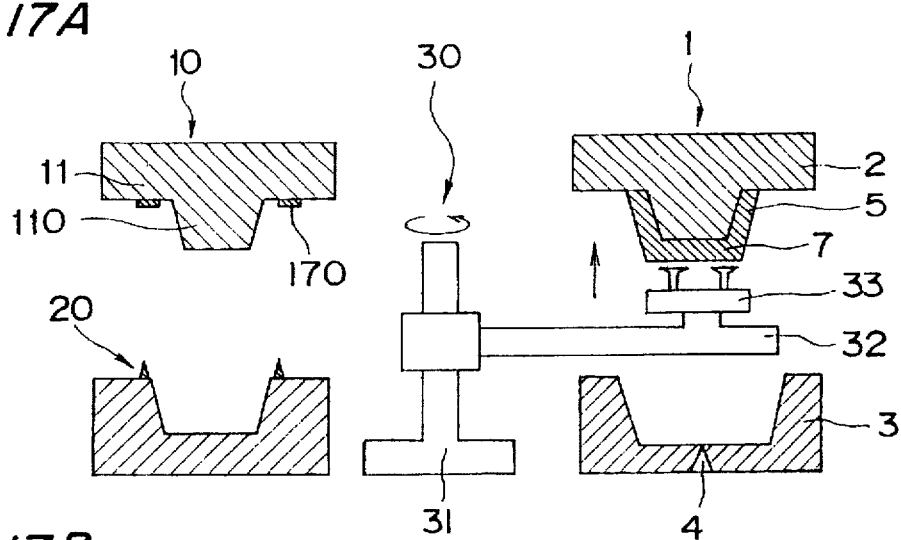
FIGS. 17A and 17B are sectional views showing one operation of the transferring/setting means of FIG. 15.
Figure 17B:
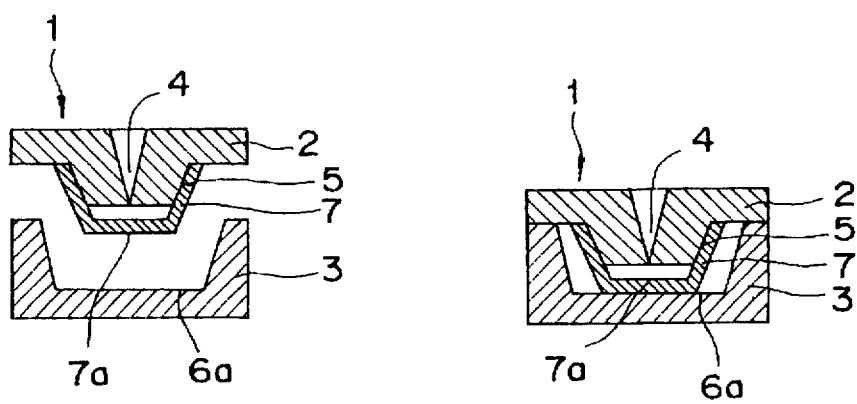

In the case where a patterned insert material 7 is to be set at the projecting cavity formation face 5 (referring to FIG. 1) of the male die 2 having a resin injection port 4 as indicated in FIG. 17B, such a preforming means 10 is desired that can preform the insert material 7 into such a shape that the bottom face of the insert material 7 is in touch with at least the bottom face of the recessed cavity formation face 6 of the female die 3 (with reference to FIG. 1) when the male and female dies 2 and 3 are clamped to constitute the cavity 8.

The clamping means 13 clamps end parts of the patterned insert material 7 before the material 7 is preformed. For the clamping means 13, upper and lower frame members having shapes surrounding the periphery of a recessed part 120 of a lower cavity die 12 which will be described later can be used to hold the end parts of the insert material 7 therebetween. It can also be possible to hold the insert material 7 between one of the above frame members and the periphery of the above recessed part.

Figure 5:
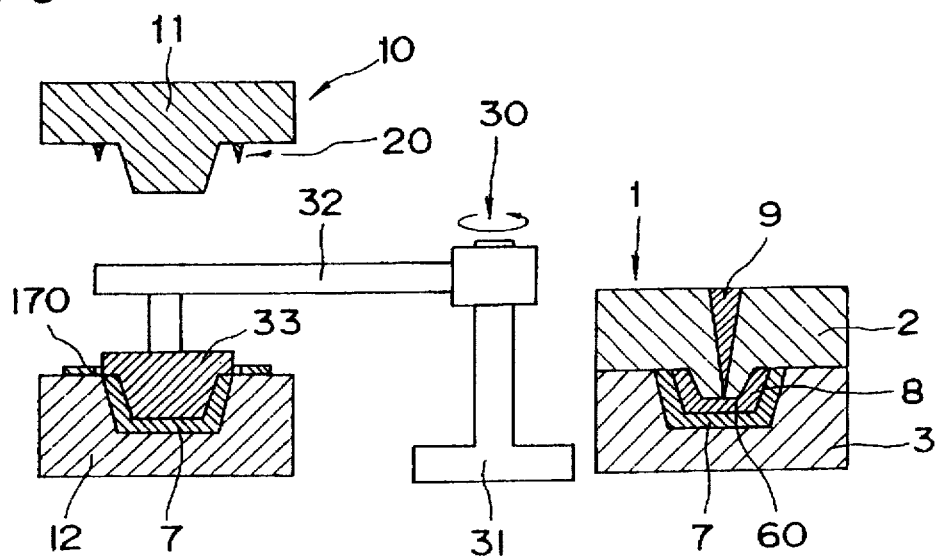
FIG. 5 is a sectional view showing a state where the preformed and trimmed patterned insert material is held in the injection molding die for injection molding in the embodiment.
Figure 6A:
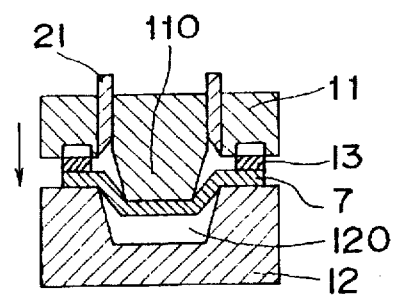
FIGS. 6A, 6B, and 6C are respectively sectional views showing states where a patterned insert material is started to be preformed, completely preformed, and trimmed by a preforming means and a trimming means in an insert molded article producing apparatus in another embodiment of the present invention.
Figure 6B:
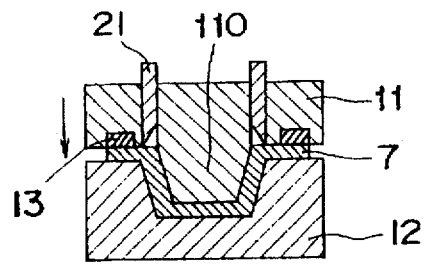
Figure 6C:
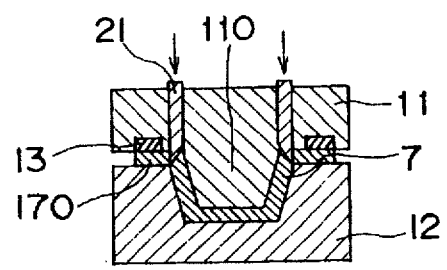

As illustrated in FIGS. 2–6A, 6B, and 6C, the preforming means 10 can be a press molding means using a preforming die composed of an upper core die 11 and the lower cavity die 12. The end parts of the insert material 7 are fixed to the lower cavity die 12 by the clamping means 13 as is clearly indicated in FIG. 6A. The upper core die 11 is pressed against the lower cavity die 12 via the insert material 7, and thus the insert material 7 is held between a projecting part 110 of the upper core die 11 and the recessed part 120 of the lower cavity die 12 and then preformed into a predetermined shape as shown in FIG. 6B. If the projecting shape of the projecting part 110 of the upper core die 11 is perfectly or approximately perfectly complementary with the shape of the projecting cavity formation face of the male die 2 of the injection molding die 1, the preformed insert material 7 is used while being set at the projecting cavity formation face 5 of the male die 2 of the injection molding die 1 (referring to FIGS. 15, 16, 17A, and 17B). On the other hand, if the recessed shape of the recessed part 120 of the lower cavity die 12 is completely agreed with or almost the same as that of the recessed cavity formation face 6 of the female die 3 of the injection molding die 1, the preformed insert material 7 is set and used at the recessed cavity formation face 6 of the female die 3 of the injection molding die 1 (referring to FIG. 4).

The preformed insert material 7 can be left in the lower cavity die 12 when a vacuum suction means 14 is attached to the lower cavity die 12 to suck the insert material 7 through vacuum suction holes 12a, or the preformed insert material 7 can be left in the upper core die 11 when a pneumatic means or an ejector means is provided in the lower cavity die 12 or when the vacuum suction means 14 is provided in the upper core die 11.

Figure 7A:
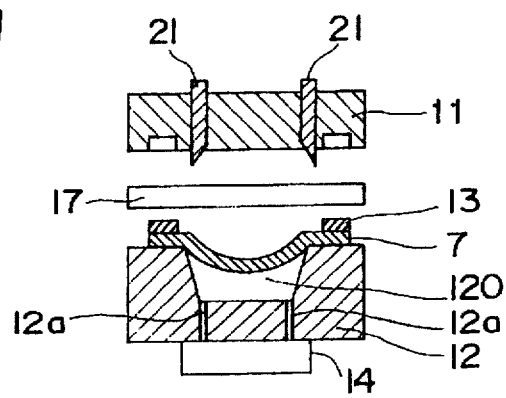
FIGS. 7A and 7B are sectional views showing a state before the patterned insert material is preformed and a state after it is preformed and trimmed, respectively, by a different preforming means and a different trimming means in the apparatus.
Figure 7B:
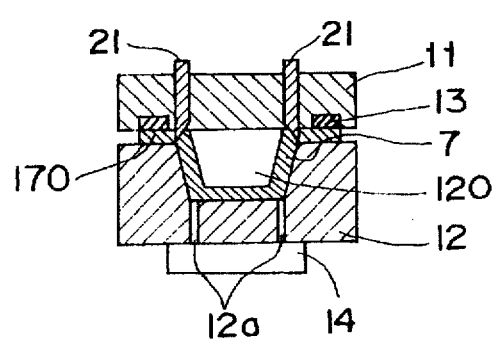

In a different preforming means 10, a vacuum molding means comprised of the lower cavity die 12 and the vacuum suction means 14 can be employed (referring to FIGS. 7A and 7B). In this case, the patterned insert material 7 which is fixed at the end parts thereof by the clamping means 13 (with reference to FIG. 7A) is tightly held in touch with the recessed face of the recessed part 120 of the lower cavity die 12 through vacuum suction (referring to FIG. 7B) and then preformed. The patterned insert material 7 is preformed either into the shape to be set at the projecting cavity formation face 5 of the male die 2 of the injection molding die 1 or into the shape to be set at the recessed cavity formation face 6 of the female die 3.

Figure 8A:
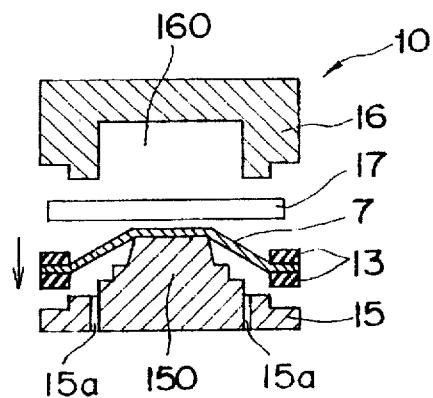
FIGS. 8A, 8B, and 8C are sectional views showing states before a patterned insert material is preformed, when it is heated and softened, and after it is preformed and trimmed, respectively, by a different preforming means and a different trimming means in the apparatus with a vacuum suction means abbreviated.
Figure 8B:
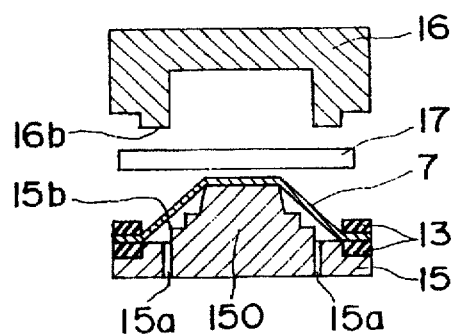
Figure 8C:
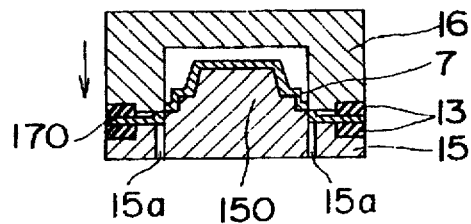

A vacuum molding means as another preforming means 10 is constituted of a preforming die composed of a lower core die 15 having a projecting part 150 and an upper cavity die 16 and, the vacuum suction means 14 for sucking the material 7 through vacuum suction holes 15a (referring to FIGS. 8A-8C). The projecting part 150 is generally is matched in shape with the cavity formation face of the injection molding die. The patterned insert material 7 with its end parts secured by the clamping means 13 (FIG. 8A) is pressed to the projecting part 150 of the lower core die 15 and heated by a heating means 17 (FIG. 8B) to be in tight contact with the projecting face of the projecting part 150 of the lower core die 15 through vacuum suction to be preformed (FIG. 8C).

When a product having a large projection is to be obtained by the preforming means of FIG. 7, the insert material is sent a long distance to the bottom of the recessed part 120 of the lower cavity die 12. That is, the central part of the insert material 7 is expanded most, thus making an ink layer of the part forming the pattern thinner, whereby the ink layer is apt to deform or break. In contrast, if the preforming means 10 of FIGS. 8A-8C of the vacuum molding means composed of: the lower core die 15 with the projecting part 150; the upper cavity die 16; and the vacuum suction means 14 sucking through the vacuum suction holes 15a is used, the central part of the patterned insert material 7 is hardly stretched, so that the ink layer of the central part is prevented from being deformed or damaged.

The patterned insert material 7 can be preformed into the shape to be fit onto the projecting cavity formation face 5 of the male die 2 of the injection molding die or on the recessed cavity formation face 6 of the female die 3 thereof. The preformed material 7 can be left in the lower core die 15 or in the upper cavity die 16. In the case where the preformed material 7 is to be left in the upper cavity die 16, the lower core die 15 is provided with a pneumatic means or an ejector means (not shown), or the upper cavity die 16 is provided with the vacuum suction means 14.

Figure 7C:
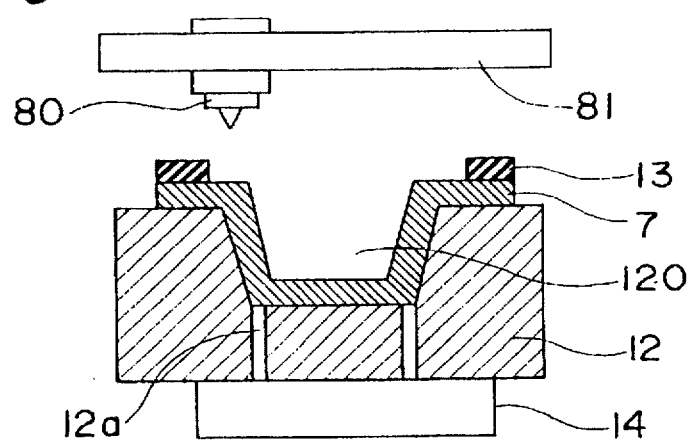
FIGS. 7C and 7D are sectional views showing other embodiments of the apparatus.
Figure 7D:
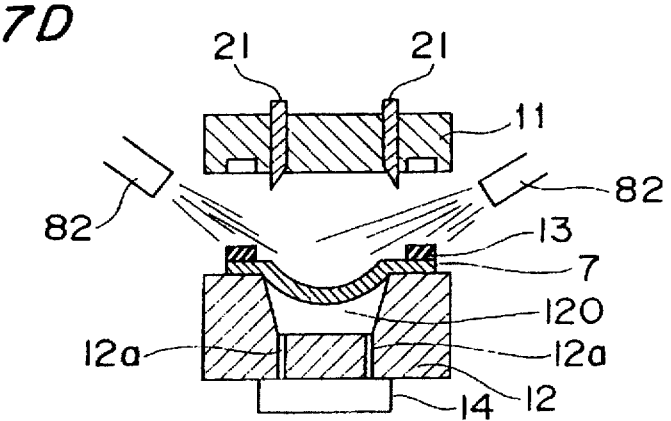

In any type of the preforming means, the heating means 17 such as a heating plate or a hot wind fan (referring to FIGS. 7A and 8A-8C) can be arranged to move between the inside and outside of the preforming means 10 to facilitate the preforming of the insert material 7. In the case where a hot wind fan is arranged, the insert material 7 can be heated from outside of the preforming means 10 as shown in FIG. 7D.

Figure 25:
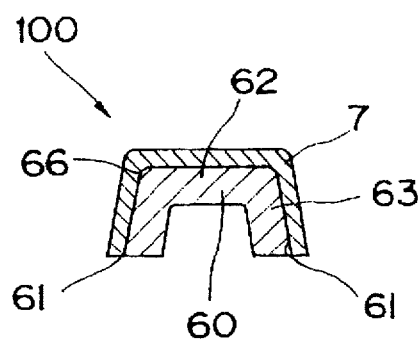
FIG. 25 is a sectional view showing an example of an insert molded article obtained in the embodiments.
Figure 26:
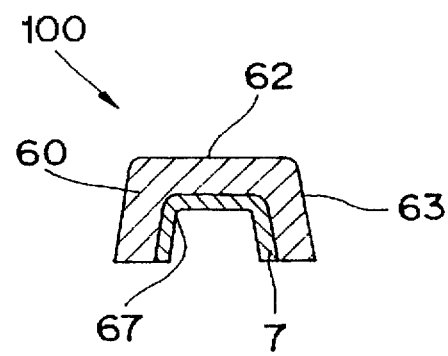
FIG. 26 is a sectional view showing one operation of another example of the insert molded article obtained in the embodiments.

The trimming means 20 (with reference to FIGS. 6A-6C, 7A, 7B, and 8A-8C) trims an unnecessary portion of the insert material 7 so as to prevent the insert material 7 from projecting out from a peripheral edge 61 of the surface of a desired cubic molded article 60 (referring to FIGS. 25 and 26). The trimming means 20 can be a press cutter with a cutting blade 21 (referring to FIGS. 6A-6C and 7A and 7B), a heating cutter (not shown) for cutting off only a required portion, or a laser cutter shown in FIG. 7C. The laser cutter has a laser emission head 80 with a laser emission opening which is mounted on an XYZ stage 81 and is made movable optionally in three dimensions, namely, in X, Y, and Z directions. As shown in FIG. 7C, the laser cutter is installed above the preforming means 10 of the vacuum molding means composed of the lower cavity die 12 and the vacuum suction means 14. Also cutting dies (referring to FIGS. 8A-8C) can be employed as the trimming means 20, which uses an edge 15b of the lower core die 15 and an edge 16b of the upper cavity die 16 to perform cutting while the gap between the edges 15b and 16b is set to be opened 0.005-0.03 mm wide when the edges 15b and 16b pass each other.

The above preforming means 10 and trimming means 20 can be constructed separately. Or a means for preforming and trimming which is comprised of a core die with the cutting blade 21 and a cavity die with the vacuum suction means 14 or a cutting die is prepared to perform preforming and trimming of the insert material at one time (referring to FIGS. 6A-6C, 7A, 7B, and 8A-8C).

The preforming means 10 or trimming means 20 can be provided with a feeding means 40 of the patterned insert material (referring to FIG. 9) composed of a rewind (or supply) roll 41 and a wind roll 42. The feeding means 40 is a means for supplying the insert material 7 before the material is preformed or trimmed intermittently by the rewind roll 41 and winding the preformed or trimmed material 7 by the wind roll 42. The insert material 7 fed from the rewind roll 41 is preformed or trimmed by the preforming means 10 or trimming means 20, and then a husk 170 is generated from the continuous patterned insert material 7 and the insert material is wound by the wind roll 42. The insert material 7 is supplied intermittently while the pattern of the material 7 is correctly positioned with respect to the trimming means 20 by a sensor or the like.

Figure 9:
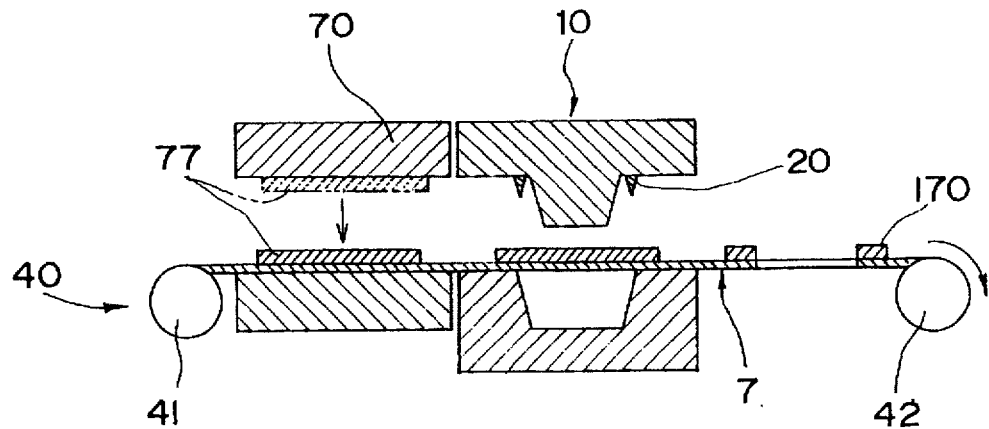
FIG. 9 is a sectional view showing an example of a feeding device of the patterned insert material to the preforming means and the trimming means in the apparatus.
Figure 13:
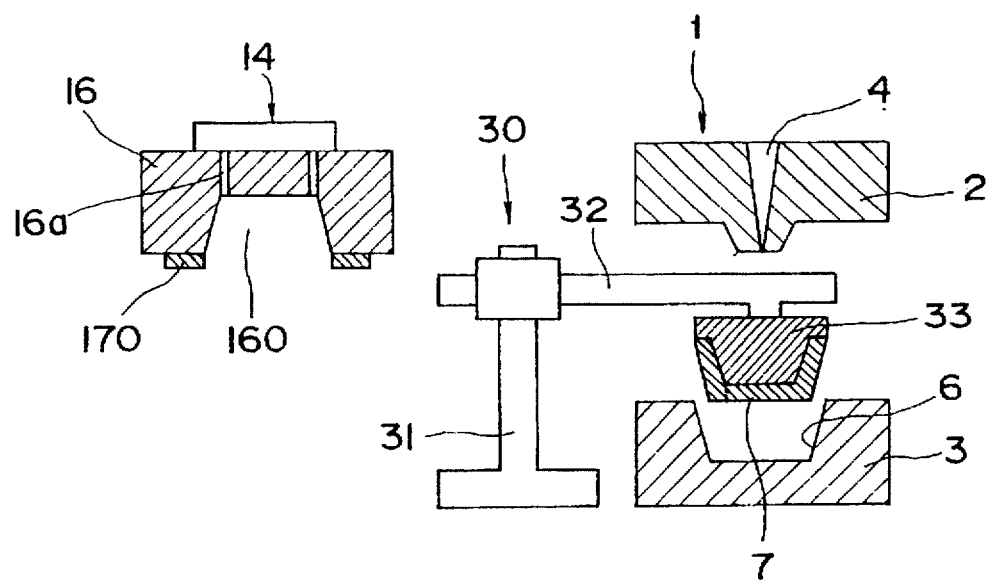
FIG. 13 is a sectional view showing one operation of the transferring/setting means in FIG. 10.
Figure 14:
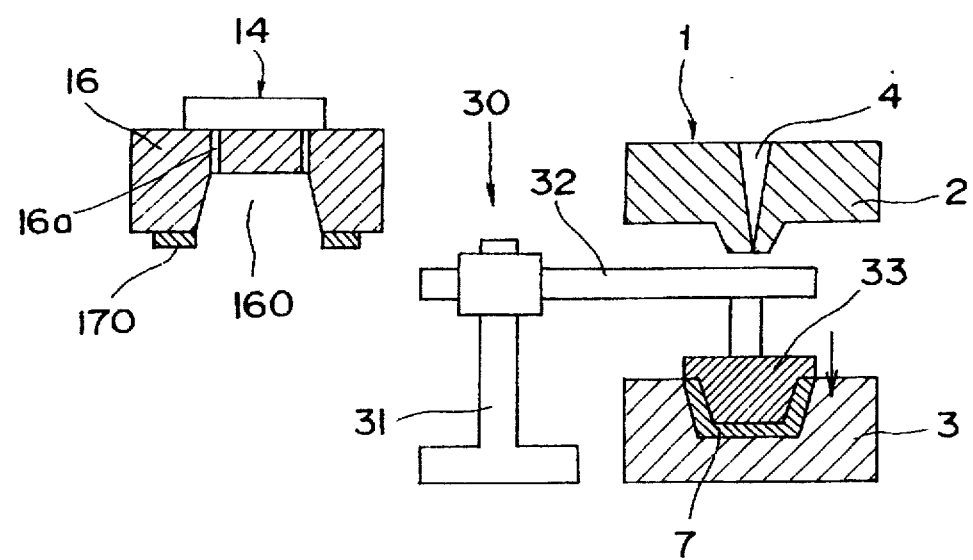
FIG. 14 is a sectional view showing one operation of the transferring/setting means in FIG. 10.

As shown in FIG. 9, a laminating means 70 having a heating part or a press part, etc. can be set in the running course of the insert material 7 between a position where the insert material is rewound and a position where the rewound material is supplied into the preforming means 10 or trimming means 20. A thick, light-permeable second base material 77 is laminated by the laminating means 70 to the insert material 7 so as to prevent the preformed insert material 7 from losing the shape and so as to have sufficient strength.

The die 1 is, as shown in FIG. 1, constituted of the male die 2 having the projecting cavity formation face 5 and the female die 3 having the recessed cavity formation face 6. When the male and female dies 2 and 3 are clamped, the cavity 8 is formed to obtain the desired cubic molded article 60. The cubic molded article 60 is, for example, a circular or an oval button-like cubic molded article (referring to FIGS. 25 and 26) having the top face 62 and the skirt portion 63 in the shape of a circular truncated cone or having the skirt portion 63 extended generally downward from the peripheral end of the top face 62, the flange portion 64 extended in the periphery of the lower end of the skirt portion 63, and the second skirt portion 65 generally downward from the peripheral end of the flange portion 64 or the like, that is, the article can be a cubic molded article with a shape having at least the top face 62 and the skirt portion 63 extended generally downward from the periphery of the top face 62 (referring to FIG. 27). The resin injection port 4 is opened at the cavity formation face constituted of the projecting cavity formation face 5 and the recessed cavity formation face 6, through which molding resin 9 is injected into the cavity 8 (referring to FIG. 5).

Figure 15:
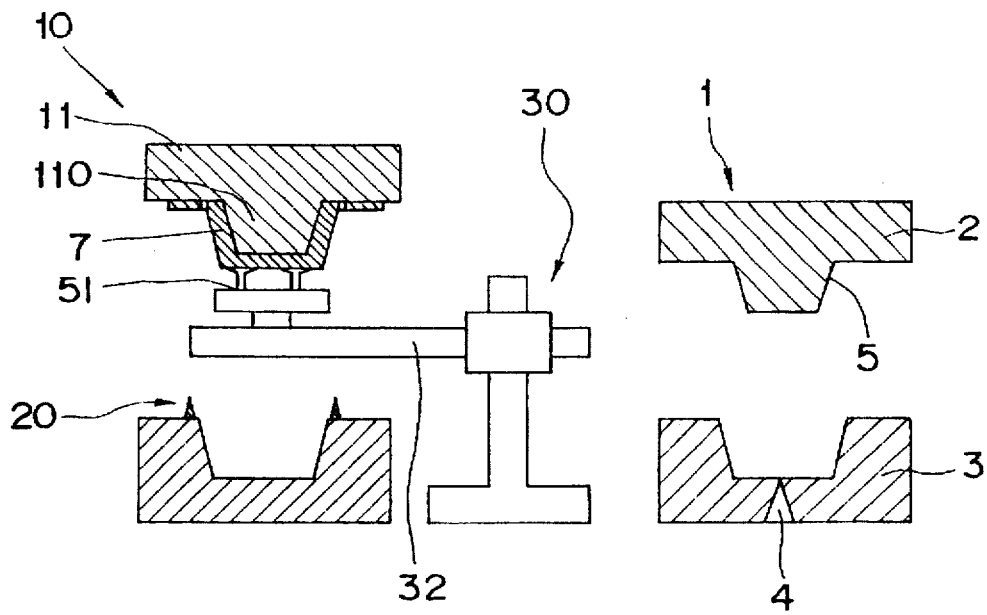
FIG. 15 is a sectional view showing a different transferring/setting means in the apparatus.

The resin injection port 4 can be formed at the projecting cavity formation face 5 of the male die 2 (referring to FIG. 1) or at the recessed cavity formation face 6 of the female die 3 (referring to FIG. 15). In the former case, the preformed and trimmed insert material 7 is set at the recessed cavity formation face 6 of the female die 3 and the obtained insert molded article 100 has the patterned insert material 7 formed at a projecting face 66 of the cubic molded article 60 (referring to FIG. 25). In the latter case, meanwhile, the preformed and trimmed insert material 7 is fed at the projecting cavity formation face 5 of the male die 2, whereby the insert material 7 is formed at a recessed face 67 of the cubic molded article 60 in the obtained insert molded article 100 (referring to FIG. 26).

As shown in FIGS. 1–5, 10–14, and 15–17, the injection molding die 1 is a die mounted to a vertical injection molding machine so constructed as to inject molding resin perpendicularly. Alternatively, the injection molding die 1 can be a die installed in a horizontal injection molding machine which injects molding resin in the horizontal direction, as in FIGS. 20–23.

A transferring/setting means 30 is a means which transfers the preformed and trimmed insert material 7 to the injection molding die 1 to set at the projecting cavity formation face 5 of the male die 2 of the injection molding die or the recessed cavity formation face 6 of the female die 3 thereof.

The transferring/setting means 30 is composed of a supporting stage 31, a movable arm 32, and a transfer head 33. The supporting stage 31 is set at a fixed position relative to the preforming means 10, trimming means 20, and injection molding die 1. The movable arm 32 is set to be turnable about the supporting stage 31 and rotatable about the axis of the movable arm 32, and moreover movable up and down and right and left relative to the supporting stage 31. The transfer head 33 is adapted to move toward and away from the movable arm 32. The transferring/setting means 30 can be a multi-joint robot.

The transfer head 33 fixed to the movable arm 32 is able to reciprocate between the set position of either the preforming means 10 or trimming means 20 and the set position of the cavity format-on face of the injection molding die 1. The transfer head 33 can be directed to the core die or the cavity die within the preforming means 10 or trimming means 20, i.e., in any optional direction. Moreover, the transfer head 33 can be directed in any direction, e.g., to the male die 2 or the female die 3 within the injection molding die 1. The transfer head 33 preferably can be provided with a vacuum suction means, a pneumatic means, or suction cups (not shown), etc. to hold or release the preformed and trimmed insert material 7 at the required time.

Figure 24:
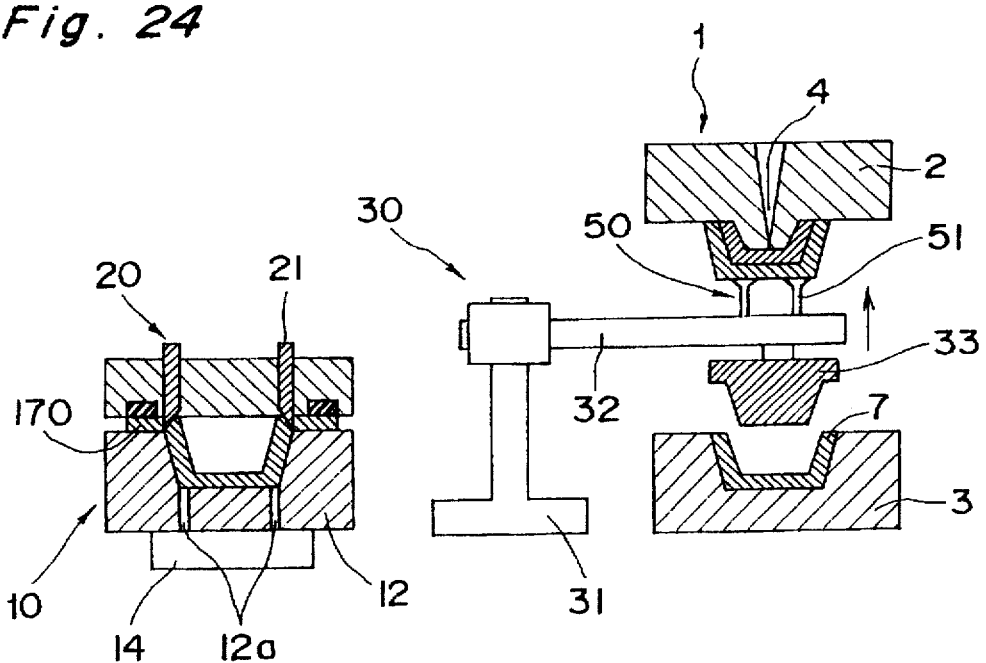
FIG. 24 is a sectional view showing a transferring/setting means provided with a take-out means of the insert molded articles in the apparatus of the embodiments.

The transferring/setting means 30 preferably can be equipped with a take-out means 50 for taking out insert molded articles. It is suitable to provide suction cups 51, a vacuum suction means, a pneumatic means (not shown), or the like at the rear face of the transfer head 33 to hold and release the insert molded article 100 at any time (referring to FIG. 24).

A producing method of the insert molded article will now be described below.

The insert material 7 having end parts clamped is preformed to almost agree with the shape of the projecting cavity formation face 5 of the male die 2 or the recessed cavity formation face 6 of the female die 3 of the injection molding die 1, and an unnecessary portion of the insert material 7 is trimmed so as not to bulge out of the peripheral edge 61 of the surface of the desired cubic molded article 60 (referring to FIGS. 25 and 26) (referring to FIGS. 2, 6A–6C, 7A, 7B, and 8A–8C).

Figure 18:
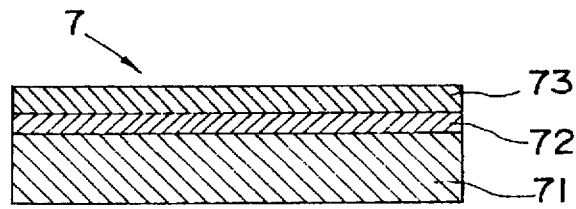
FIG. 18 is a sectional view showing a patterned insert material used in the embodiments.

Such ink layers as a pattern layer 72, an adhesive layer 73, and the like are sequentially laminated on a base material 71 to obtain the insert material 7 (referring to FIG. 18). The base material 71 is used as a base film or a base sheet of a general-purpose patterned insert material made of plastic film such as polyethylene terephthalate. The pattern layer 72 is formed by a general method, e.g., printing with the use of a light-permeable ink, a light-shielding ink or the like to represent patterns, figures, logotypes, characters, outline types, symbols, etc. on the surface of the molded article 60. The pattern layer 72 can have a metallic layer formed through vacuum vapor deposition. The adhesive layer 73 serves to make the insert material 7 adhere to the surface of the molded article 60 simultaneously with the molding of the article 60. Resin of the same series as that constituting the molded article 60 is used to form the adhesive layer 73 in a general method like printing.

For the patterned insert material, a light-shielding ink layer of outline types and an adhesive layer are sequentially formed on the base sheet. In another example of the patterned insert material, after a light-shielding ink layer is formed, a light-permeable colored ink layer is formed to cover at least the outline types and an adhesive layer is overlaid. The outline types are seen with the color of an illuminating light in the former insert material, while the letters are indicated with the color of the light-permeable colored ink layer in the latter insert material. The outline types are preferably formed on the base sheet so that the light-shielding ink layer forms the outline types (that is, a portion where the light-shielding ink is not adhered represents a letter). The outline types can be in an optional pattern of characters, symbols, patterns, figures, or logotypes, etc.

Figure 19:
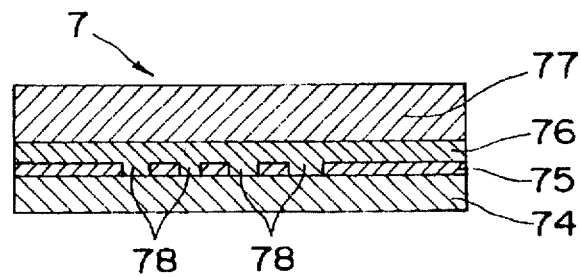
FIG. 19 is a sectional view showing a different patterned insert material used in the embodiments.

For obtaining the light-shielding patterned insert material 7, a first colored layer 75 with opening parts 78 for outline types to indicate letters or symbols is formed on a first light-permeable base material 74, and a second colored layer 76 having light permeable properties is formed at least on the opening parts 78, which is further covered with a thick second light-permeable base material 77. The opening parts 78 produce outline types in an optional pattern of characters, symbols, patterns, figures, logotypes, etc. The thick second light-permeable base material 77 is a base material of a film or a sheet formed to provide the appropriate strength to the whole insert material 7 so as to avoid the deformation of the material 7 subsequent to the preforming (referring to FIG. 19). Any material is employable as the patterned insert material 7 so long as it can be preformed and trimmed and tightly held in touch with the molding resin 9.

The insert material 7 is preferably preformed by the preforming means 10 described earlier. At this time, the insert material 7 can be heated and softened by using the heating means 17 during pressing or vacuum molding so as to facilitate the preforming (referring to FIGS. 7A and 8A–8C). In order to obtain the patterned insert material 7 to be set at the projecting cavity formation face 5 of the male die 2 having the injection port 4 (referring to FIG. 17B), it is suitable to preform the insert material 7 into such a shape that the bottom face of the insert material 7 comes in contact with the bottom of the recessed cavity formation face 6 of the female die 3 when the male and female dies 2 and 3 are clamped to form the cavity 8 (referring to FIG. 17B).

If the insert material 7 is to be preformed by the vacuum molding means composed of the preforming die composed of the lower core die 15 which has the projecting part 150 approximately agreeing with the shape of the cavity formation face of the female die 3 of the injection molding die 1 and the upper cavity die 16, the vacuum suction means 14 and the clamping means 13 for clamping the end parts of the patterned insert material 7 (referring to FIGS. 8A–8C), there are two basic preforming methods as follows.

According to one method, while the end parts of the patterned insert material 7 are clamped by the clamping means 13, the material 7 is heated by the heating means 17 and softened, to thereby be brought into contact with the top face of the projecting part 150 of the lower core die 15. The insert material 7 is thus preformed to trace the projecting shape of the lower core die 15. A portion of the pattern of the patterned insert material or a portion without the pattern can be brought on the top face of the projecting part 150 of the lower core die 15.

On the other hand, according to a different method, the top face of the projecting part 150 of the lower core die 15 is set in contact with the insert material 7 beforehand. Thereafter, the insert material 7 is heated and softened by the heating means 17.

For bringing the top face of the projecting part 150 of the lower core die 15 into contact with the insert material 7, the clamping means 13 can be moved close to the preforming die, or the lower core die 15 along with the projecting part can be moved close to the clamping means 13.

The trimming of the insert material 7 is preferably carried out by the aforementioned trimming means 20. The trimming shape of the insert material 7 can be a shape not protruding from the peripheral edge 61 of the surface of the desired cubic molded article 60 obtained by the injection molding die 1 or a shape protruded therefrom. More specifically, in the case where the cubic molded article 60 is a button-like cubic molded article having the top face 62 and the skirt portion 63 of a circular truncated cone (referring to FIGS. 25 and 26), the trimming shape of the insert material 7 is such a shape that the material 7 covers the top face 62 and the skirt portion 63 of the article 60 and at the same time, not to protrude from the peripheral edge 61 of the skirt portion 63 in the shape like a tongue (referring to FIGS. 25 and 26). In another example, when the molded article 60 has such a shape that the skirt portion 63 is formed below the peripheral edge of the top face 62 and also the flange portion 64 is formed in the periphery of the skirt portion 63 and the second skirt portion 65 is formed down below the peripheral edge of the flange portion 64, the trimming shape of the insert material 7 is such a shape as to cover the light-permeable cubic molded article 60 in a manner not to project from the flange portion 64 or the second skirt portion 65 (referring to FIG. 27).

The insert material 7 can be preformed and trimmed in separate steps or simultaneously by one means (referring to FIGS. 6A–6C, 7A, 7B, and 8A–8C).

For preforming and trimming the insert material 7, the insert material 7 can be intermittently supplied to the preforming means 10 or trimming means 20 by using the feeding means 40 comprised of the rewind roll 41 and the wind roll 42 (referring to FIG. 9). In a case where the insert material 7 has the thick second light-permeable base material 77 described above the base material 77 may be too hard to wind up in a roll. In such case, the second light-permeable base material 77 is laminated by a laminating means 70 or the like before the insert material 7 without the second light-permeable base material 77 reaches the preforming means 10 or trimming means 20 (referring to FIG. 9) after being unwound from the rewind roll 41, and then, the material 7 is preformed and trimmed and wound by the wind roll 42 (referring to FIG. 9), preferably.

Thereafter, the preformed and trimmed insert material 7 is transferred to the injection molding die 1 and then set at the cavity formation face of the male die 2 or female die 3 of the injection molding die 1 (referring to FIGS. 3–5, FIGS. 10–14, 15, 16, 17A, 17B, and 20–23). The cavity formation face is the projecting cavity formation face 5 of the male die 2 and the recessed cavity formation face 6 of the female die 3.

The above transferring and setting operation of the preformed and trimmed insert material 7 may be performed by the transferring/setting means 30 composed of the supporting base 31, movable arm 32, and transfer head 33 as depicted earlier.

Figure 3:
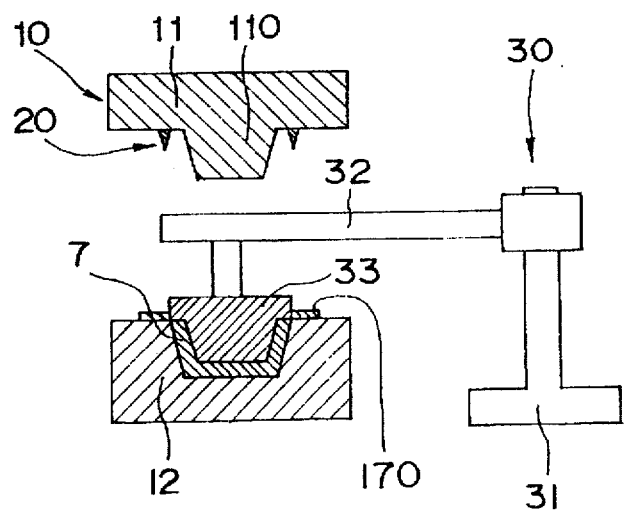
FIG. 3 is a sectional view showing a state where the preformed and trimmed patterned insert material is held by a transferring/setting means in the apparatus.
Figure 4:
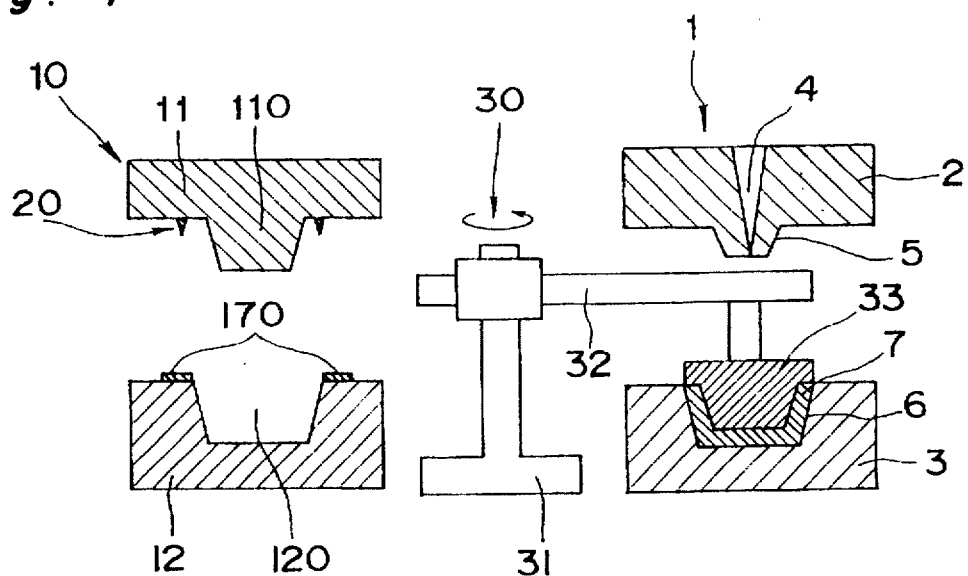
FIG. 4 is a sectional view showing a state where the preformed and trimmed patterned insert material is set in an injection molding die by the transferring/setting means in the embodiment.

For instance, when the patterned insert material 7 remaining in the recessed part 120 of the lower cavity die 12 of the preforming means 10 is transferred and set at the recessed cavity formation face 6 of the injection molding die 1 mounted to the vertical injection molding machine (referring to FIGS. 3 and 4), first, the transfer head 33 is brought close to the recessed part of the lower cavity die 12 of the preforming means 10 to hold the insert material 7 by the transfer head 33 (referring to FIG. 3). Then, the movable arm 32 is rotated 180° about the supporting stage 31 to set the transfer head 33 to face to the recessed cavity formation face 6 of the injection molding die 1 (referring to FIG. 4). Upon necessity, the insert molded article 100 left at the projecting cavity formation face 5 is caught by the take-out means 50 arranged at the rear side of the transfer head 33 (referring to FIG. 24), and the transfer head 33 is retracted from within the injection molding die 1 in order to prepare for the next transfer (referring to FIG. 5).

When the patterned insert material 7 left in the upper cavity die 16 of the preforming means 10 is transferred and set at the recessed cavity formation face 6 of the injection molding die 1 installed in the vertical injection molding machine (referring to FIGS. 10–14), first, the transfer head 33 directed upward is brought close to the recessed part 160 of the upper cavity die 16 of the preforming means 10 to hold the insert material 7 by the transfer head 33 (referring to FIGS. 10 and 11). The transfer head 33 is subsequently rotated 180° about the axis of the movable arm 32 to face downward (referring to FIG. 12). Then, the movable arm 32 is turned 180° about the supporting stage 31 (referring to FIG. 13), so that the transfer head 33 is set facing to the recessed cavity formation face 6 of the injection molding die 1 (referring to FIG. 14). Thereafter, the transfer head 33 is retracted from inside the injection molding die 1 to make preparation for the next transfer.

Figure 16:
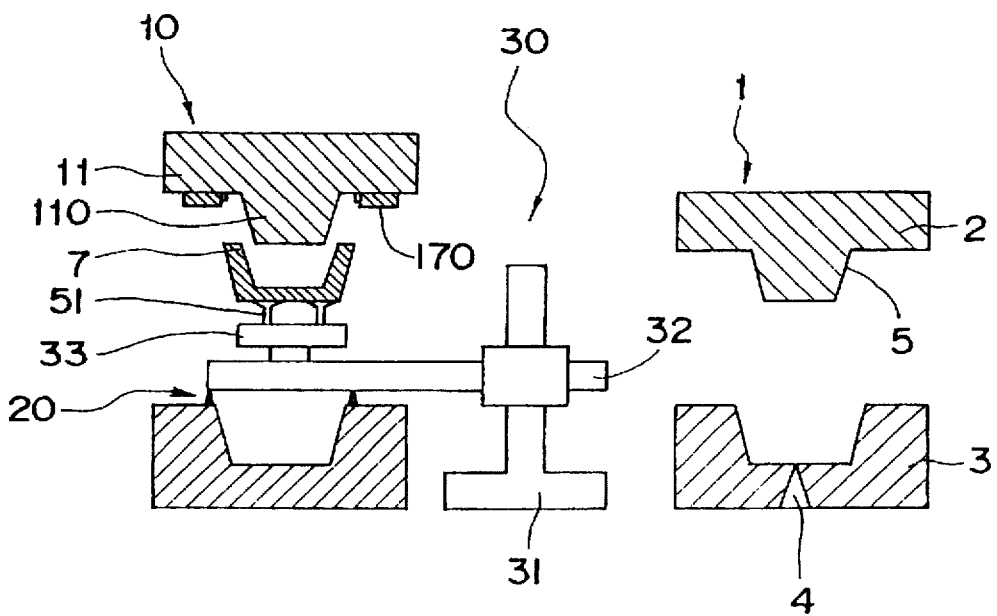
FIG. 16 is a sectional view showing one operation of the transferring/setting means of FIG. 15.

Alternatively, when the insert material 7 left at the projecting part 110 of the upper core die 11 of the preforming means 10 is transferred to be set at the recessed cavity formation face 6 of the injection molding die 1 mounted to the vertical L injection molding machine (referring to FIGS. 15–17), first, the upturned transfer head 33 is moved close to the projecting part 110 of the upper core die 11 of the preforming means 10 thereby to hold the insert material 7 by the suction cups 51 provided in the transfer head 33 (referring to FIGS. 15 and 16). In this state, the movable arm 32 is turned 180° around the supporting stage 31 to move the transfer head 33 to confront the projecting cavity formation face 5 of the injection molding die 1 (referring to FIG. 17A). The transfer head 33 is then retracted from within the injection molding die 1 to make preparation for the next transfer.

Figure 20:
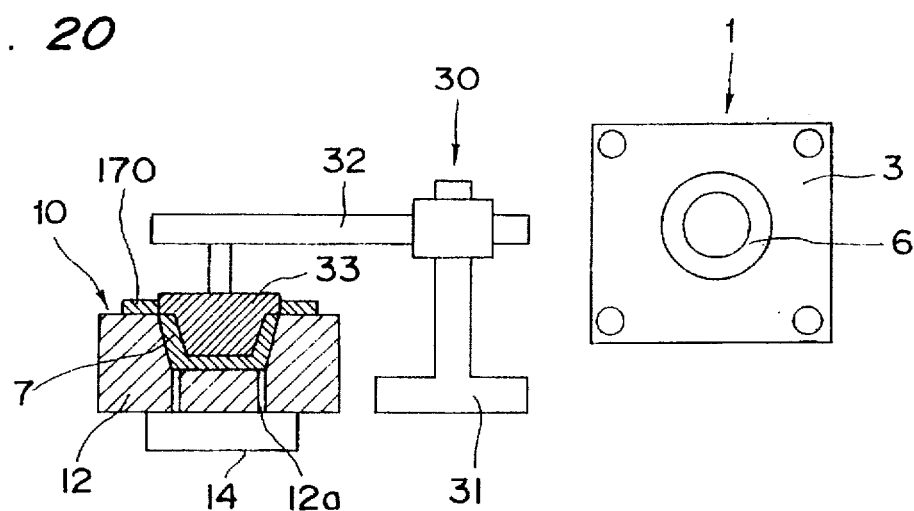
FIG. 20 is a sectional view showing a further different transferring/setting means in the apparatus of the embodiments.
Figure 21:
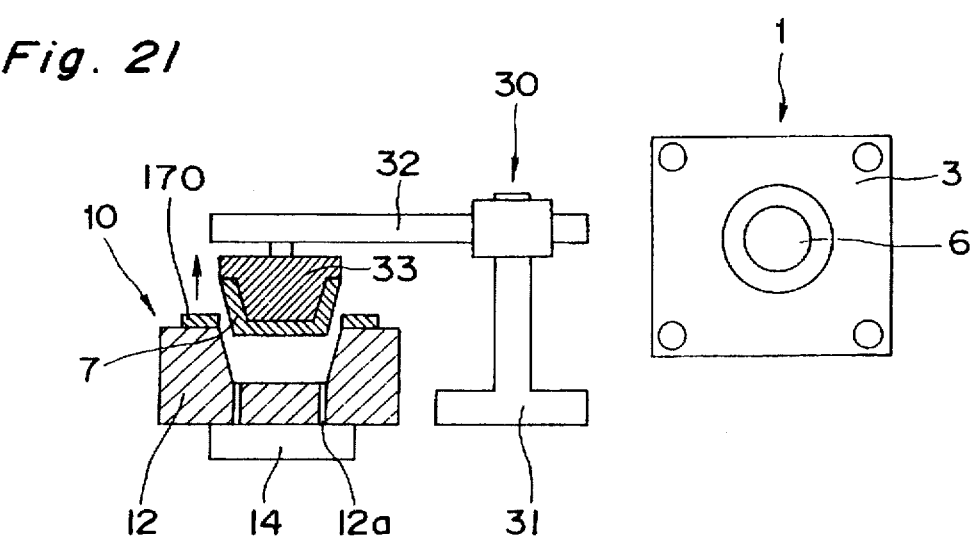
FIG. 21 is a sectional view showing one operation of the transferring/setting means of FIG. 20.
Figure 22:
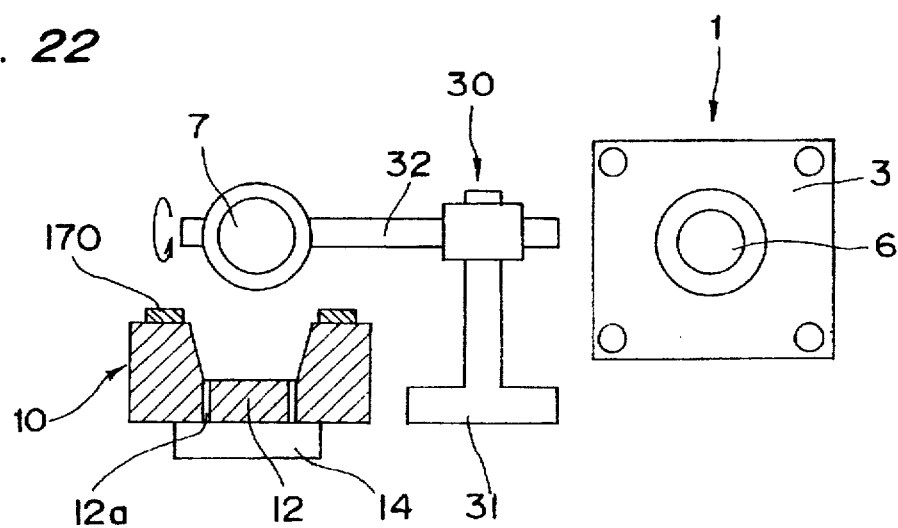
FIG. 22 is a sectional view showing one operation of the transferring/setting means of FIG. 20.
Figure 23:
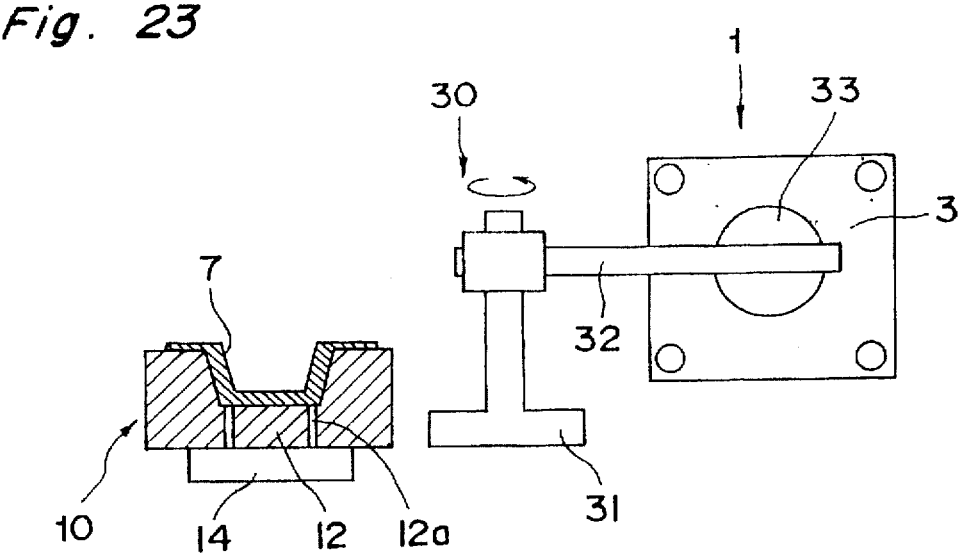
FIG. 23 is a sectional view showing one operation of the transferring/setting means of FIG. 20.

When the insert material 7 left at the recessed part 120 of the lower cavity die 12 of the preforming means 10 is transferred and set to the recessed cavity formation face 6 of the injection molding die 1 set in the horizontal injection molding machine (referring to FIGS. 20–23), the transfer head 33 is moved close to the recessed part 120 of the lower cavity die 12 of the preforming means 10 to hold the insert material 7 by the transfer head 33 (referring to FIGS. 20 and 21). Then, the transfer head 33 is rotated 90° about the center axis of the shaft of the movable arm 32 (referring to FIG. 22). The movable arm 32 is turned 180° around the supporting stage 31 to set the transfer head 33 to confront the recessed cavity formation face 6 of the injection molding die 1 (referring to FIG. 23). If it is necessary, the insert molded article 100 remaining at the projecting cavity formation face 5 is held by the take-out means 50 set at the rear face of the transfer head 33 (referring to FIG. 24). The transfer head 33 is then retracted from inside the injection molding die 1 to make preparation for the next transfer.

Since the patterned insert material 7 is preformed beforehand to approximately agree with the recessed cavity formation face 6 of the female die 3 or projecting cavity formation face 5 of the male die 2, it can be set at a predetermined position only by being fitted in the recessed cavity formation face 6 of the female die 3 or projecting cavity formation face 5 of the male die 2.

At the next stage of the producing method, the male and female dies 2 and 3 are clamped to form the cavity 8, and the molding resin 9 is injected into the cavity 8 (referring to FIG. 5). When the cubic molded article 60 is cooled and solidified, the molded article 100 in which the insert material 7 is formed on the surface of the article 60 is removed from the injection molding die 1. The article 100 can be removed therefrom by the take-out means 50 set at the rear side of the transfer head 33 or the like means.

The adhesive layer of the insert material 7 is melted by the heat of the resin when the molding resin 9 is injected. As the molding resin 9 is cooled and solidified, the adhesive layer is bonded to the surface of the article 60. The molding resin 9 is composed of resin such as acrylonitrile styrene, polycarbonate, polystyrene, acryl, or polyester.

The present invention in the above-described constitution and operation displays such effects as follows.

According to the producing method of an insert molded article according to the present invention, the patterned insert material is preformed so as to correspond in shape to the cavity formation face of the male or female die of the injection molding die, and an unnecessary portion of the insert material is trimmed so as not to project from the peripheral edge of the surface of a cubic molded article before the patterned insert material is set in the injection molding die. Therefore, it is prevented that the film refuse is adhered to or accumulated at the surface of the injection molding die or mingles with the molten resin. The insert molded articles can be produced with a high yield. Moreover, it is also possible to effectively prevent the situation in which a broken piece of the blade when the insert material is cut enters the injection molding die or the insert material is not properly cut. Since the insert material is preformed to correspond to the cavity formation face of the male or female die of the injection molding die, it is not necessary to form a notch in the insert material even if the cavity formation face of the s male or female die of the injection molding die has a three-dimensional shape. Accordingly, the molding resin is prevented from leaking through the notch to adhere to the surface of the insert material. Without the notch, moreover, the beauty of the molded article is never lost.

As a portion of the insert material corresponding to the top face of an insert molded article is brought into contact with the top face of the projecting part of the preforming die, the portion is expanded very little in the processes afterwards. Although the insert material is softened at this time by the heat, the portion in contact with the top face of the projecting part of the preforming die tends to be less softened than the portion not in contact with the top face, and therefore, the former portion is also little expanded although the latter portion not in contact with the top face is stretched through vacuum suction. As a result of this, the generation of wrinkles, the positional shift, the deformation or breakage of the ink layers can be effectively prevented.

Further, according to the present invention, by the transferring/setting means, the preformed insert material can be directly set at the cavity formation face of the die of the male and female dies of the injection molding die which is not provided with the resin injection port. Therefore, since it is not necessary for the insert material is not to be pressed from one die to the other die by the pressure of the molding resin, the insert material is prevented from being deformed, wrinkled or shifted in position.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as included therein.

What is claimed is:

1. A method of producing an insert molded article, comprising:

providing an injection molding die including a female die having a cavity formation face and a male die having a cavity formation face;

providing a preforming die having a projecting part corresponding to one of the cavity formation face of the female die and the cavity formation face of the male die;

providing a trimming device;

providing a transfer head movable between the injection molding die and at least one of the preforming die and the trimming device;

forming a patterned insert material in the preforming die while the patterned insert material is clamped at end parts thereof in the preforming die by a clamping device and while a pattern of the patterned insert material is located at a predetermined position on the projecting part of the preforming die, so as to form a preformed patterned insert conforming to a shape of the projecting part of the preforming die;

trimming, from the preformed patterned insert, an unnecessary portion of the preformed patterned insert so that the unnecessary portion does not project from a peripheral edge of the preformed patterned insert;

operating the transfer head for removing the preformed and trimmed patterned insert from the preforming die, for transferring the preformed and trimmed patterned insert into the injection molding die and for setting the preformed and trimmed patterned insert against one of said cavity formation face of said female die and said cavity formation face of said male die;

closing said male and female dies relative to one another such that said cavity formation face of said female die and said cavity formation face of said male die together constitute a cavity;

injecting a molding resin into said cavity; and removing the insert molded article from said injection molding die after the molding resin has cooled and solidified.

2. The method according to claim 1, wherein prior to the preforming of the patterned insert material, the patterned insert material after being heated and softened is brought into contact with an end face of the projecting part of the preforming die, and the patterned insert material is preformed to agree in shape with the projecting part of the preforming die.

3. The method according to claim 1, wherein prior to the preforming of the patterned insert material, the patterned insert material is heated and softened after being brought into contact with an end face of the projecting part of the preforming die, and the patterned insert material is preformed to agree in shape with the projecting part of the preforming die.

4. The method according to claim 1, wherein prior to the preforming of the patterned insert material, the patterned insert material is brought into contact with an end face of the projecting part of the preforming die while being heated and softened, and the patterned insert material is preformed to agree in shape with the projecting part of the preforming die.

5. The method according to claim 2, wherein the clamping device clamping the end parts of the patterned insert material is moved close to the preforming die when the patterned insert material is brought into contact with the end face of the projecting part of the preforming die.

6. The method according to claim 1, wherein the unnecessary portion of the patterned insert is trimmed by casting of a laser beam.

7. The method according to claim 3, wherein the clamping device clamping the end parts of the patterned insert material is moved close to the preforming die when the patterned insert material is brought into contact with the end face of the projecting part of the preforming die.

8. The method according to claim 4, wherein the clamping device clamping the end parts of the patterned insert material is moved close to the preforming die when the patterned insert material is brought into contact with the end face of the projecting part of the preforming die.

9. The method according to claim 2, wherein the unnecessary portion of the patterned insert is trimmed by casting of a laser beam.

10. The method according to claim 3, wherein the unnecessary portion of the patterned insert is trimmed by casting of a laser beam.

11. The method according to claim 4, wherein the unnecessary portion of the patterned insert is trimmed by casting of a laser beam.

12. The method according to claim 5, wherein the unnecessary portion of the patterned insert is trimmed by casting of a laser beam.

13. An apparatus for producing an insert molded article, comprising:

an injection molding die including a female die having a cavity formation face and a male die having a cavity formation face;

a preforming device for preforming a patterned insert material by thermal molding to form a preformed patterned insert corresponding to a shape of one of the cavity formation face of the female die and the cavity formation face of the male die;

a clamping device for clamping end parts of the patterned insert material relative to said preforming device for holding the patterned insert material during preforming of the patterned insert material by thermal molding in the preforming device;

a trimming device for trimming, from the patterned insert material, an unnecessary portion of the patterned insert material so that the unnecessary portion does not project from a peripheral edge of the preformed patterned insert;

a transferring/setting device, comprising a transfer head movable between the injection molding die and at least one of the preforming device and the trimming device, for removing the preformed and trimmed patterned insert from the preforming device, for transferring the preformed and trimmed patterned insert into the injection molding die and for setting the preformed and trimmed patterned insert against one of said cavity formation face of said female die and said cavity formation face of said male die; and wherein said cavity formation face of said female die and said cavity formation face of said male die together constitute a cavity of said injection molding die for molding the insert molded article from the preformed and trimmed patterned insert.

14. The apparatus according to claim 13, further comprising a patterned insert material feeding device for supplying patterned insert material intermittently to said preforming device before preforming and trimming and for winding up the material after the material has been preformed and trimmed.

15. The apparatus according to claim 13, wherein said preforming device and said trimming device are integrally coupled to constitute a single preforming and trimming device and said preforming and trimming device is operable to simultaneously carry out preforming and trimming of the patterned insert material clamped by the clamping device.

16. The apparatus according to claim 13, wherein the preforming device comprises a preforming die having a projecting part corresponding in shape to said one of the cavity formation face of the male die and the cavity formation face of the female die.

17. The apparatus according to claim 13, wherein the preforming device comprises a preforming die having a cavity die which corresponds in shape to one of said cavity formation face of the male die and said cavity formation face of said female die, and a suction device for sucking the patterned insert material to a surface of said cavity die which is in contact with the patterned insert material.

18. The apparatus according to claim 13, wherein the trimming device comprises a laser casting device for trimming the unnecessary portion of the patterned insert by casting of a laser beam.

19. The apparatus according to claim 14, wherein said preforming device and said trimming device are integrally coupled to constitute a single preforming and trimming device, and said preforming and trimming device is operable to simultaneously carry out preforming and trimming of the patterned insert material clamped by the clamping device.

20. The apparatus according to claim 14, wherein said preforming device comprises a preforming die having a projecting part corresponding in shape to said one of said cavity formation face of said male die and said cavity formation face of said female die.

21. The apparatus according to claim 15, wherein said preforming device comprises a preforming die having a projecting part corresponding in shape to said one of said cavity formation face of said male die and said cavity formation face of said female die.

22. The apparatus according to claim 14, wherein said preforming device comprises a preforming die having a cavity die which corresponds in shape to one of said cavity formation face of said male die and said cavity formation face of said female die, and a suction device for sucking the patterned insert material to a surface of said cavity die which is in contact with the patterned insert material.

23. The apparatus according to claim 15, wherein said preforming device comprises a preformed die having a cavity die which corresponds in shape to one of said cavity formation face of said male die and said cavity formation face of said female die, and a suction device for sucking the patterned insert material to a surface of said cavity die which is in contact with the patterned insert material.

24. The apparatus according to claim 16, wherein said preforming device comprises a preforming die having a cavity die which corresponds in shape to one of said cavity formation face of said male die and said cavity formation face of said female die, and a suction device for sucking the patterned insert material to a surface of said cavity die which is in contact with the patterned insert material.

25. The apparatus according to claim 14, wherein said trimming device comprises a laser casting device for trimming the unnecessary portion of the patterned insert by casting of a laser beam.

26. The apparatus according to claim 15, wherein said trimming device comprises a laser casting device for trimming the unnecessary portion of the patterned insert by casting of a laser beam.

27. The apparatus according to claim 16, wherein said trimming device comprises a laser casting device for trimming the unnecessary portion of the patterned insert by casting of a laser beam.

28. The apparatus according to claim 17, wherein said trimming device comprises a laser casting device for trimming the unnecessary portion of the patterned insert by casting of a laser beam.

29. An insert molded article including a top face, a first peripheral skirt portion extending generally downwardly from a periphery of said top face, a flange portion extending from a periphery of a lower end of said first peripheral skirt portion, a second peripheral skirt portion extending generally downwardly from a periphery of said flange portion, wherein surfaces of said top face, said first peripheral skirt portion, said flange portion, and said second peripheral skirt portion are covered with a patterned insert material, and wherein a pattern of said patterned insert material is formed on a portion of said patterned insert material covering said top face.

30. An insert molded article according to claim 29, wherein said top face is circular, and each of said first peripheral skirt portion, said flange portion, and said second peripheral skirt portion is annular.

* * * * *